United States Patent [19]

Shulman

[11] 4,021,908

[45] May 10, 1977

[54] METHOD OF SCULPTURING WITH PLASTIC MATERIAL

[76] Inventor: Mildred Shulman, 15 Charles St., New York, N.Y. 10014

[22] Filed: Oct. 23, 1975

[21] Appl. No.: 625,308

Related U.S. Application Data

[62] Division of Ser. No. 459,532, April 10, 1974, abandoned.

[52] U.S. Cl. .............................. 29/428; 240/10 F; 428/13; 428/155

[51] Int. Cl.$^{2}$ ........................................ B23P 11/00

[58] Field of Search ............ 29/428, 400 M, 400 R; 428/155, 13, 38, 542, 543; 350/96 R, 321, 96 T, 188; 225/2; 240/10 F, 10 R, 1 LP, 1 EL

[56] References Cited

UNITED STATES PATENTS

| | | | |
|---|---|---|---|
| 2,543,981 | 3/1951 | Munao et al. | 264/279 |
| 3,000,774 | 9/1961 | Swedlow | 428/155 X |
| 3,639,549 | 2/1972 | Tugwell | 264/331 X |
| 3,738,035 | 6/1973 | Bricker | 240/10.1 X |

*Primary Examiner*—Victor A. DiPalma
*Attorney, Agent, or Firm*—Alfred E. Miller

[57] ABSTRACT

A method of sculpturing using solid plastic configurations, such as blocks, and in which a general shape is formed and liquid plastic is poured in a multiplicity of steps over the general shape while utilizing means for controlling the plastic flow in order to achieve the desired shape. Another method of sculpturing with plastic material is set forth whereby a solid plastic block is drilled internally and the holes are fractured to form an internal sculpture.

1 Claim, 5 Drawing Figures

METHOD OF SCULPTURING WITH PLASTIC MATERIAL

The present application is a divisional application of co-pending application Ser. No. 459,532, filed on APR. 10, 19974.

An object of the present invention is to provide a method of sculpturing plastic to make recognizable and aesthetically pleasing forms from an initial general shape. Another object of the present invention is to internally sculpture a plastic from, such as a block, and thereby create a sculpture that achieves a startling effect with internal lighting.

The invention will now be more fully described with reference to the accompanying drawings, in which.

DESCRIPTION OF THE PREFERRED EMBODIMENTS

This invention is directed to a method of sculpturing by initially setting up translucent plastic cubes or balls in a pattern to a general desired shape. The cubes or balls are connected together by means of a solvent and to a transparent plastic plate. Thereafter, a liquid resin mixture is produced constituting a polyester resin or equivalent in its liquid state that is mixed with a catalyst MEK (methyl ethyl ketone) or equivalent. Prior to adding the catalyst to the liquid plastic, the color, if any, is mixed in a container and added to the plastic solution and can be translucent or opaque. After the liquid plastic is mixed until hardening is about to take place, at that precise moment, the liquid plastic is poured over the above-mentioned general desired shape. The flow of the liquid plastic is controlled by sticks or by the former's fingers, and the control of the layer of liquid plastic is achieved while the same is setting on the general form. The step of pouring liquid plastic over the general shape is repeated many times in order to build the structure up in layers until the ultimate desired from is achieved. It should be noted that any of the plastic layers can be either clear or colored. Furthermore, the general desired shape can be turned or manipulated to achieve the desired liquid flow by gravity. At least twelve, and up to twenty, pouring steps of very thin layers of plastic are utilized in the present invention.

After the sculpture is completed, the same is placed over a projected light, so that the light rays penetrate the interior of the sculpture resulting in an aesthetically beautiful structure. Thus, the foregoing method is a progressive sculpture constituting many layers of liquid plastic that harden to the desired configuration.

If it is necessary to have small, delicate sections in the sculpture, these sections can be pre-shaped apart from the sculpture and attached with a pouring step, causing the sections to fuse into the large sculpture.

The desirable mixture of acrylic resin and catalyst is one to three ounces of acrylic resin to one ounce catalyst, depending upon the hardness required at each pouring step.

Figure 1:
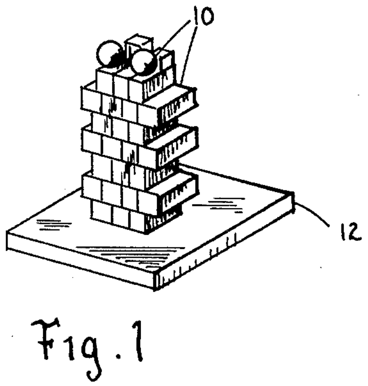
FIG. 1 is a front elevational view of the first step of the sculpturing method in accordance with the teachings of the present invention.
Figure 2:
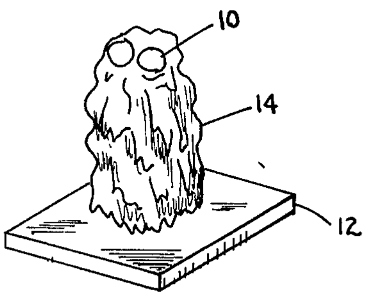
FIG. 2 is a front elevational view of the shape formed by the method after the liquid plastic is poured a number of times over the original general shape.
Figure 4A:
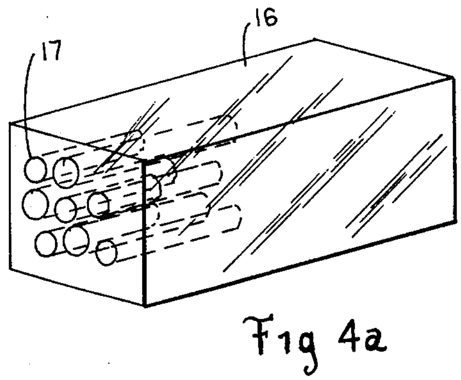
FIG. 4 is a prespective view of a clear plastic block having internal holes that are fractured to form an internal sculpture in accordance with the teachings of the present invention; and FIG. **4*a*** is a perspective view of the pilot holes in the block.
Figure 3:
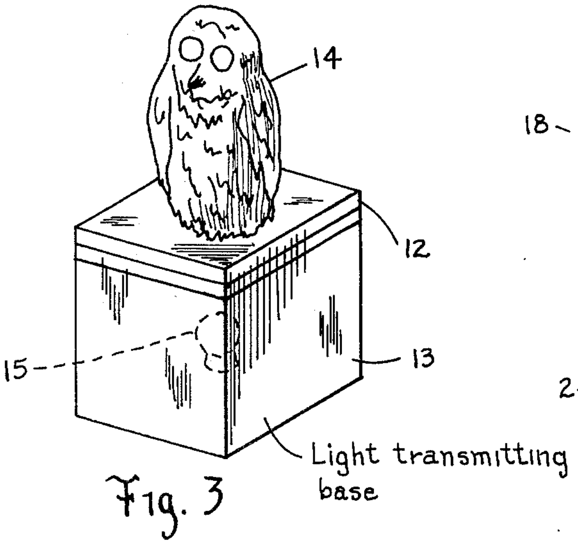
FIG. 3 is a front elevational view of the resultant sculpture after a number of further pouring steps.

Referring to FIGS. 1—3, it will be observed that FIG. 1 illustrates a general form consisting of plastic blocks and balls 10 which are mounted on a transparent plate 12. The liquid plastic 14, as described hereinbefore, is poured over the pre-aranged blocks and balls 10 is successive steps in order to achieve the desired configuration and as shown in FIG. 3, and thereafter mount the same on top of the light transmitting base 13 provided with a light bulb 15.

Figure 4:
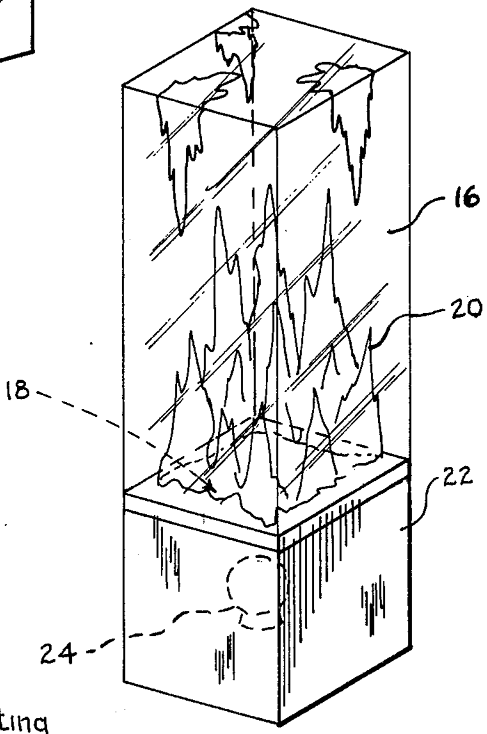

As seen in FIG. 4, the present method of internal sculpturing comprises the use of clear translucently colored pre-molded, solid configuration plastic blocks or balls of any size, which can be an acrylic resin or any plastic compound. The sculpturing is accomplished by working from one side of the block or ball and penetrating the acrylic resin or plastic by means of a drill, either electric or hand. The penetration of the block is in the form of spaced pilot holes of any width which may be drilled to varying depths. The depths and widths of the pilot hole vary and determine the magnitude of internal structure.

After the pilot holes have been selectively placed in the arcylic or plastic block, the desired design is created by semi-controlled fracturing, cracking, and chipping the plastic in the walls of each of the pilot holes. The walls of adjacent holes can be so fractured that they merge or simi-merge into one or more lrger holes. The result of this operation is the formation of an internal stalactitic and stalagmitic pattern or an internal irregular crystalizing structure. The open end of the formation of the acrylic resin block is placed over a light transmitting base 22 housing a light bulb which projects light up into the interior of the formation. The light can be various colors, thereby altering the aesthetic effect.

It should be pointed out that the internal fracturing of the acrylic resin block never damages the exterior of the block. The block walls remain planar and undamaged.

Hardened metal instruments are used for fracturing the acrylic resin or plastic, and the overall results of this method are to produce, for example, landscapes, ocean scenes, human or animal bodies.

FIG. **4*a* illustrates a solid plastic block 16 in which pilot holes have been drilled into the bottom surface 17. Thereafter, as shown in FIG. 4, the holes are chipped and broken in order to produce internal fractured formations 20. The block 16 is thereafter placed on a light-transmitting base 22 and a light bulb 24 located underneath the base projects light up through the top of the base and irradiates the interior and the internal holes in the block 16.**

I claim:

1. A method of sculpturing in a pre-molded, solid plastic form comprising drilling a plurality of pilot holes in one end of said plastic from, chipping and cracking said internal holes whereby said holes merge or semi-merge in order to form an internal sculpture with said one being at least partially open, and placing the open end of said sculpture on top of a lighted light transmitting base whereby the fractured internal holes and interior of the plastic from are irradiated.

* * * * *